May 16, 1950 J. R. CLARK ET AL 2,507,962
DOWN LOCK FOR LANDING GEARS

Filed Aug. 18, 1948 3 Sheets-Sheet 1

INVENTOR.
George P. Mina
John R. Clark
BY
M. B. Tasker
ATTORNEY

May 16, 1950     J. R. CLARK ET AL     2,507,962
DOWN LOCK FOR LANDING GEARS

Filed Aug. 18, 1948     3 Sheets-Sheet 3

INVENTOR.
George P. Mina
John R. Clark
BY
M. B. Tasker
ATTORNEY

Patented May 16, 1950

2,507,962

UNITED STATES PATENT OFFICE 2,507,962

DOWN LOCK FOR LANDING GEARS

John R. Clark, Stratford, Conn., and George P. Mina, Massapequa Park, N. Y., assignors to United Aircraft Corporation, East Hartford, Conn., a corporation of Delaware Application August 18, 1948, Serial No. 44,838

7 Claims. (Cl. 244—102)

1

This invention relates to improvements in aircraft landing gear of the retracting type and more specifically to a mechanism which will positively lock the landing gear in a down or extending position.

It is an object of this invention to disclose an improved landing gear locking mechanism that will lock the main or auxiliary landing gear of an aircraft when such gear is extended and, further, to provide an improved locking mechanism which prevents the landing gear from being inadvertently retracted while the airplane is on the ground.

Another object of this invention is to provide a simple, rugged and positive down locking device for use on aircraft landing gear.

This particular invention safeguards against the inadvertent retracting of the landing gear when the airplane is taxiing or in any ground engaging position other than being completely airborne. The design and operation of this device makes it possible to retract the landing gear only when the weight of the aircraft has been completely removed from the landing gear mechanism. This down lock functions in response to the normal operation of the retracting mechanism and needs no other controls or preliminary motion on the part of the pilot to disengage the locking means.

These and other objects and advantages will become apparent from the following detailed description of the drawings wherein like characters refer to similar parts throughout.

In these drawings.

Figure 1:
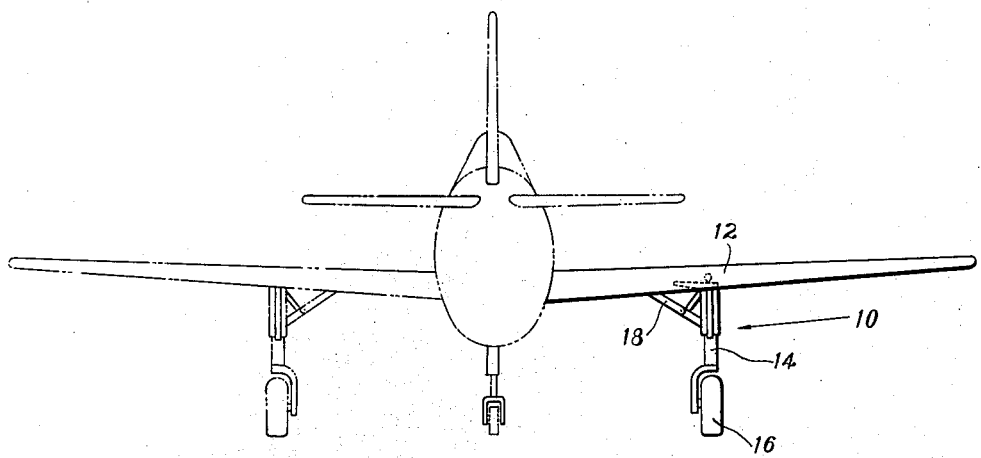
Fig. 1 is a rear elevation of an airplane showing the landing gear installation according to this invention.

Referring now to Fig. 1, the landing gear generally indicated at 10 is supported on fixed structure in the wing 12 and includes an oleo strut 14, the usual wheel and tire combination 16 and a brace 18 which are provided to maintain and support the landing gear in the correct position.

Figure 2:
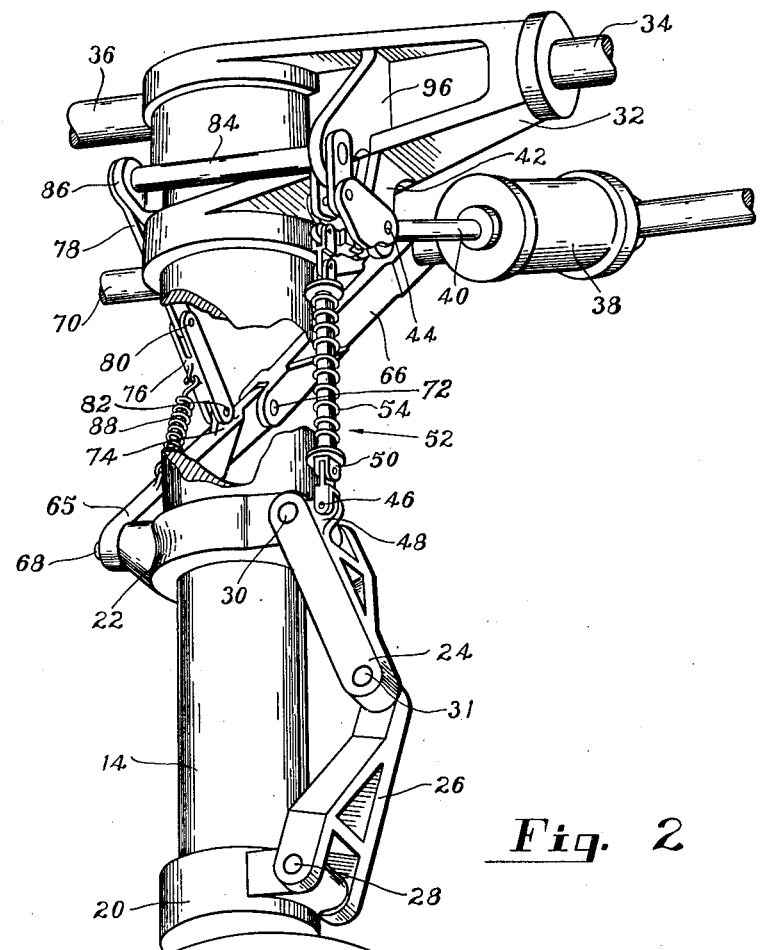
Fig. 2 is a detail perspective view of the landing gear including the down lock mechanism.

Referring now to Fig. 2, the telescoping oleo strut 14 carries a collar 20 at its lower end and a collar 22 at its upper end. The oleo strut 14 operates in a normal manner wherein loads imposed on the strut will cause it to compress and removal of these loads will cause the strut to extend. Collars 20 and 22 are connected by scissors arms 24 and 26 which have their remote ends pivotally connected to collars 20 and 22 at 28 and 30, respectively while their adjacent ends are pivotally connected together by the pin 31. The arms 24 and 26 maintain the proper fore and aft alignment of the wheel 16 with the upper portion of the landing gear mechanism while still permitting vertical flexing of the oleo strut elements.

Figure 4:
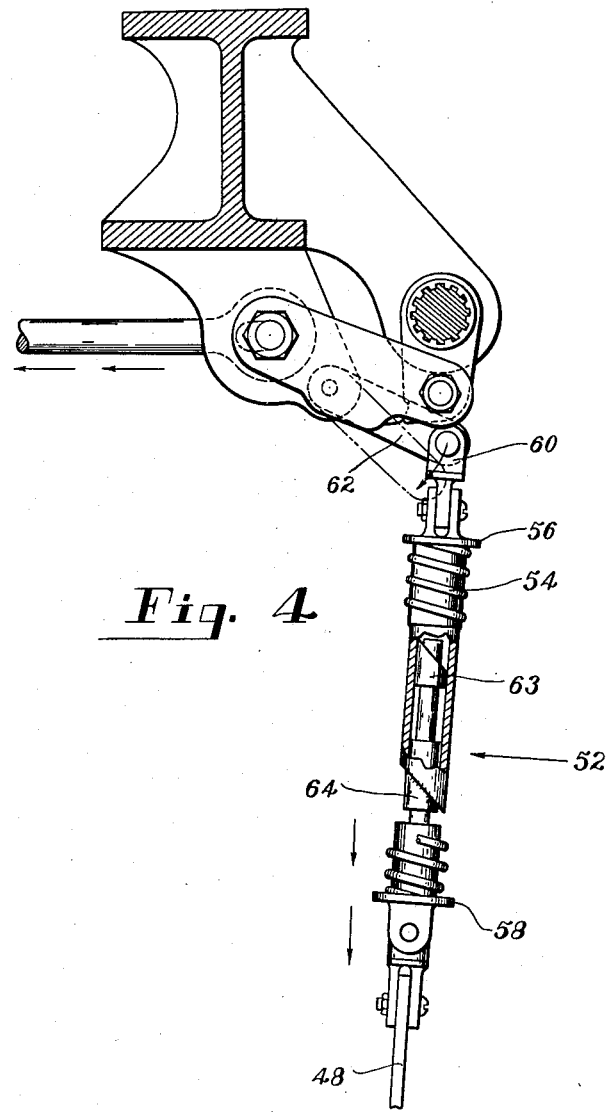
Fig. 4 is a side elevation of a portion of the locking mechanism in partial section.

The entire landing gear is pivoted on a trunnion 32 having integral rotatable bearing shafts 34 and 36 which are pivotally mounted in suitable housings in the aircraft structure. A hydraulic actuating strut 38, one end of which is pivotally secured to the airplane structure and the other end of which is connected to the landing gear, is provided for extending and retracting the landing gear by pivoting the latter on bearing shafts 34 and 36. A piston rod 40 which is connected to the piston within the strut 38 provides the actuating connection between the strut and the landing gear mechanism. To this end an extending flange 42 projects below the main body of the trunnion 32 and is pivotally connected to the piston rod 40 at 44 so that when the hydraulic strut is actuated the main landing gear will rotate about the axis of rotation of shafts 34 and 36. The collar 22 on the upper end of the oleo strut 14 carries a pivot pin 46 within a depending ear 48 for connecting thereto a universal joint 50 which is attached to the lower end of the telescoping shaft 52, best seen in Fig. 4. A spring 54 is fixed between the shoulders 56 and 58 which are located on the remote ends of the telescoping elements of the shaft 52 thereby biasing the shoulders 56 and 58 away from each other. The upper end of the telescoping shaft 52 carries another universal joint 60 which is attached to a link 62 the function of which will become apparent hereinafter. It is apparent that the telescoping shaft 52 will reach the limit of its extension when the collar 63 on the inner slidable element abuts the sleeve 64 on the lower end of the outer slidable element of shaft 52. However, the shaft 52 will telescope within itself against the action of spring 54 when the oleo strut 14 is extending and contracting as the airplane leaves the ground or when the wheel is bouncing over rough terrain.

Referring now to Fig. 2 the landing gear down lock includes two toggle members or locking links 65 and 66, whose remote ends are pivotally connected at 68 to the collar 22 and to a shaft 70, respectively, and whose adjacent ends are pivotally connected by a pin 72. The link 65 carries an upstanding ear 74 intermediate its ends to pivotally support one end of a pair of links 76 and 78 which are interconnected at 80. To this end a pin 82 pivotally connects the lower remote end of link 76 to the ear 74 on link 65 while the upper remote end of link 78 is rigidly secured to a shaft 84 which is rotatably journalled at one end in a flange 86 extending from the trunnion 32; the other end of shaft 84 being mounted in another flange 96 in a manner to be described in connection with Fig. 3. A spring 88 is connected between link 76 and link 65 and tends to rotate the locking link 76 in a counterclockwise direction from a broken joint position to an in-line or over center position in relation to its cooperating link 78. With the links 76 and 78 in the in-line position the links 65 and 66 will also be fixed in the in-line position.

Figure 3:
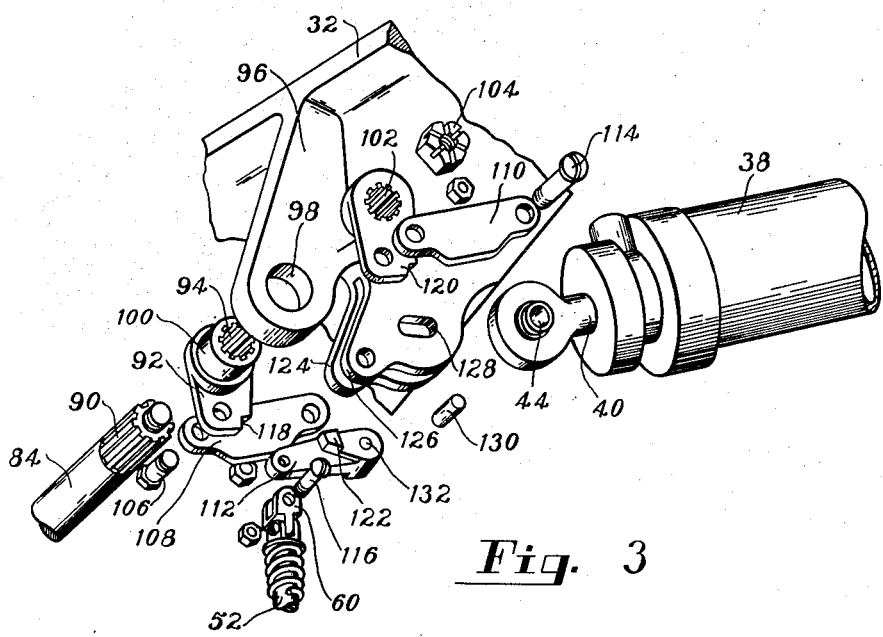
Fig. 3 is a detailed exploded view of the landing gear locking mechanism.

As seen more clearly in Fig. 3 the shaft 84 carries a splined end 90 which fixedly receives an arm 92, having a cooperating internal spline 94 therein. Accordingly, the flange 96 which depends from the trunnion 32 contains a passage 98 which receives the arm 92 and has a working fit with the external surface 100 thereof so as to provide a rotatable support for shaft 84 at this point. Another arm 102 has a splined fit on the end of shaft 84 while the nut 104 holds both arms 92 and 102 firmly on the shaft 84 so that any rotational movements of the shaft 84 will be transmitted to the arms 92 and 102. A bolt 106 fastens one end of the links 108 and 110 to the depending portions of arms 92 and 102, respectively, the links 108 and 110 being spaced apart to permit a wedge 112 to freely fit therebetween. The wedge 112 has one end pivotally attached between parallel extending flanges 124 and 126, which are integral with the trunnion 32, by means of a pin 130 which is held in place by links 108 and 110 while the other relatively free end of wedge 112 is connected to the universal joint 60 by bolt 116.

The arms 92 and 102 carry notches 118 and 120, respectively, at their lower ends which cooperate with abutment surfaces 122 on either side of the wedge 112, only one of these abutments being visible in Fig. 3. The extending flanges 124 and 126 receive the end of piston rod 40 therebetween and contain a slot 128 which serves to operatively connect the flanges to the rod by means of a bolt 114 which also secures the other end of links 108 and 110 thereto. The connection of the piston rod 40 to the slot 128 forms a lost motion connection between the strut 38 and the landing gear trunnion 32, the purpose of which will become apparent as the description proceeds.

In operation then, let us assume the airplane is on the ground with the weight of the aircraft on the landing gear. In this condition the oleo strut is partially compressed and the distance between collars 20 and 22 is less than when the aircraft is in flight. As the distance between collars 20 and 22 changes, the angle between scissors arms 24 and 26 also varies and accordingly, scissors arm 24 rotates about its pivot 30. Rotation of arm 24 simultaneously causes rotation of the ear 48 thereon to impart vertical motion to the telescoping rod 52. Consequently, similar upward movement of the wedge 112 is effected so that the abutment surfaces 122 on the wedge 112 engage the notches 118 and 120 of arms 92 and 102. Such engagement prevents any counterclockwise movement of the arms 92 and 102 and this will accordingly prevent any counterclockwise rotation of the shaft 84 which has a splined connection therewith. Since shaft 84 is held fixed, the locking links 76 and 78 (Fig. 2) will be maintained in their in-line or over center position and consequently the links 65 and 66 will also be maintained in an in-line or locked position thereby positively locking the entire landing gear in the down or extended position. The landing gear will be maintained in the down-locked position until such time as the locking links 65 and 66 are unlocked even though the hydraulic strut 38 is inadvertently actuated.

Now let us assume the airplane has become airborne and the oleo strut is fully extended due to the weight of the airplane being removed therefrom and due to the weight of the wheel and tire urging further extension. As the oleo strut extends, the distance between collars 20 and 22 becomes greater and the angle formed between scissors arms 24 and 26 increases so that the scissors arm 24 rotates in a clockwise direction thereby urging the telescoping shaft 52 toward a downward or extended position. It should be noted that the spring 54 on the shaft 52 prevents the wedge 112 from being moved or jarred from its engaged position while the wheel is travelling over rough terrain or the like. Downward motion of the rod assembly 52 results in rotation of the wedge 112 about its pivot point 132 to disengage the abutment surfaces 122 from the notches 118 and 120 of the arms 92 and 102, respectively. In this position of the wedge 112 the shaft 84 is free to rotate. Rotation of the shaft 84 will commence when the hydraulic strut 38 is actuated toward a retracted position. Thus when the pilot moves the landing gear control lever (not shown) in the cockpit, fluid under pressure will cause strut 38 to retract. During the initial movements of retraction of strut 38, the bolt 114 which is connected at 44 to the piston rod 40 slides within the slot 128 so that a limited lost motion occurs between the piston rod 40 and the parallel flanges 124, 126 on the trunnion 32. During this lost motion movement of the piston rod 40 the shaft 84 is rotated as a result of motion being imparted to the connecting links 108 and 110 and the arms 92 and 102, the latter being splined to the shaft 84. As the shaft 84 is rotated the links 76 and 78 are caused to rotate against the action of spring 88 from their in-line or over center locking position to a broken position so that upon further rotation of shaft 84 the links 65 and 66 are caused to rotate thereby breaking the in-line or over center locking position between the latter. Since the links 65 and 66 comprise the side brace 18 (Fig. 1) of the landing gear assembly, further actuation of the cylinder 38 will retract the landing gear about the trunnion bearing shafts 34 and 36 (Fig. 2).

As a result of this invention an improved aircraft landing gear down lock has been provided which is simple, light and rugged and which positively prevents inadvertent retraction of the landing gear until the aircraft has become airborne.

Further as a result of this invention an improved landing gear down lock mechanism has been provided wherein upon release of the weight of the aircraft from the gear the initial actuating movements of the power strut unlock the landing gear and subsequent actuation of the strut retracts the landing gear.

Although only one preferred embodiment of this invention has been illustrated and described herein it will be evident that various modifications and changes can be made in the shape and arrangement of the various parts without departing from the scope of this novel concept.

We claim:

1. In a landing gear for an aircraft including an oleo strut pivoted at its upper end to structure of the aircraft and carrying at its lower end a ground engaging member, scissors elements pivotally connected to the upper and lower ends of said oleo strut for maintaining alignments therebetween, retracting mechanism comprising a trunnion, actuating means operatively connected to said trunnion for retracting and extending said gear, a supporting toggle pivotally connected at one end to said oleo strut and at its other end to fixed structure of said aircraft, toggle means operatively connected to one of said scissors elements for locking said supporting toggle, and means for locking said toggle means responsive to rotation of said last mentioned scissor element.

2. In a landing gear for aircraft including an oleo strut pivoted at its upper end to structure of the aircraft and carrying at its lower end a ground engaging member, said oleo being adopted for extension and retraction, respectively, in response to disengagement and engagement of said member, retracting mechanism comprising a trunnion, actuating means operatively connected with the trunnion for retracting and extending said gear, a supporting toggle connected at one end to said oleo strut intermediate the ends of the latter and at its other end to fixed structure of said aircraft, means comprising a toggle for locking said supporting toggle, means for locking said locking toggle including cooperating elements responsive to retraction of said oleo strut, and means for unlocking said first locking means upon disengagement of said ground engaging member including linkage responsive to the initial movements of said actuating means toward a landing gear retracted position.

3. In a landing gear for an aircraft including a telescoping oleo strut pivoted at its upper end to structure of the aircraft and carrying at its lower end a ground engaging member, retracting mechanism comprising a trunnion, actuating means operatively connected with said trunnion for retracting said extending said gear, a supporting toggle coupling said oleo strut to fixed structure in the aircraft, a toggle for locking said supporting toggle when said landing gear is extended, means for locking said locking toggle, and resilient means included in said locking toggle locking means to maintain said locking toggle positively locked during oscillation and jarring of said ground engaging member until said member is fully disengaged from the ground.

4. In a landing gear for aircraft including an oleo strut pivoted at its upper end to structure of the aircraft and carrying at its lower end a ground engaging member, retracting mechanism comprising a trunnion, actuating means operatively connected with the trunnion for retracting and extending said gear, a supporting toggle connected at one end to said oleo strut intermediate the ends of the latter and at its other end to fixed structure of said aircraft, means for locking said supporting toggle in the extended position of said gear including a locking toggle connected at one end to said supporting toggle and at its other end to a shaft, an arm on said shaft, a link connecting the free end of said arm to said actuating strut, said connection having lost motion therein, an abutment for engaging and holding said arm against movement thereof by said actuating strut to retract said gear, and means responsive to engagement of said ground engaging member for moving said abutment into locking position.

5. In a landing gear for aircraft including an oleo strut pivoted at its upper end to structure of the aircraft and carrying at its lower end a ground engaging member, retracting mechanism comprising a trunnion, actuating means operatively connected with the trunnion for retracting and extending said gear, a supporting toggle connected at one end to said oleo strut intermediate the ends of the latter and at its other end to fixed structure of said aircraft, means for locking said supporting toggle in the extended position of said gear including a locking toggle connected at one end to said supporting toggle and at its other end to a shaft, an arm on said shaft, a link connecting the free end of said arm to said actuating strut, said connection having lost motion therein, means responsive to movements of said shaft for maintaining said supporting toggle stationary in opposition to movement of said actuating strut toward a gear retracted position.

6. In a landing gear for aircraft including an oleo strut pivoted at its upper end to structure of the aircraft and carrying at its lower end a ground engaging member, retracting mechanism comprising a trunnion, actuating means operatively connected with the trunnion for retracting and extending said gear, a supporting toggle connected at one end to said oleo strut intermediate the ends of the latter and at its other end to fixed structure of said aircraft, means for locking said supporting toggle in the extended position of said gear including a locking toggle connected at one end to said supporting toggle and at its other end to a shaft, an arm on said shaft, a link connecting the free end of said arm to said actuating strut, said connection having lost motion therein, an abutment for engaging and holding said arm against movement thereof by said actuating strut to retract said gear, and means responsive to engagement of said ground engaging member for moving said abutment into locking position including telescoping elements having a resilient member therebetween biasing said elements in an extended position.

7. In an airplane landing gear having an oleo strut carrying a ground engaging member at its lower end and carrying a trunnion at its upper end, said trunnion being pivotally supported to the airplane structure, actuating means operatively connected to said trunnion for retracting and extending said gear, a brace having foldable elements connected to one end to said oleo strut and at its other end to fixed structure of said airplane, means for locking said brace in the extended position of said gear including a locking toggle connected at one end to one of said elements and at its other end to a shaft, resilient means interconnected between said toggle and one of said brace elements for urging said toggle in a locked position, an arm on said shaft, a link connecting the free end of said arm to said actuating strut, said link connection having lost motion therein, an abutment for engaging and holding said arm against movement thereof by said actuating strut to retract said gear, means responsive to engagement of said ground engaging member for moving said abutment into locking position, and means responsive to disengagement of said ground engaging member for unlocking said locking toggle in opposition to said resilient means.

JOHN R. CLARK.
GEORGE P. MINA.

REFERENCES CITED

The following references are of record in the file of this patent:

UNITED STATES PATENTS

| Number | Name | Date |
| --- | --- | --- |
| 2,101,611 | Dowty | Dec. 7, 1937 |
| 2,292,671 | Sumner | Aug. 11, 1942 |
| 2,374,146 | Waters | Apr. 17, 1945 |
| 2,427,885 | Turnasky | Sept. 23, 1947 |

Certificate of Correction

Patent No. 2,507,962                                                       May 16, 1950

JOHN R. CLARK ET AL.

It is hereby certified that error appears in the printed specification of the above numbered patent requiring correction as follows:

Column 5, line 34, for the word "said", first occurrence, read *and*;

and that the said Letters Patent should be read with this correction therein that the same may conform to the record of the case in the Patent Office.

Signed and sealed this 1st day of August, A. D. 1950.

[SEAL]

THOMAS F. MURPHY,
*Assistant Commissioner of Patents.*